United States Patent [19]
Suzuki

[11] Patent Number: 5,643,137
[45] Date of Patent: Jul. 1, 1997

[54] LOCKUP CONTROL APPARATUS FOR AUTOMATIC TRANSMISSION AND THE METHOD THEREOF

[75] Inventor: Hosei Suzuki, Tokyo, Japan

[73] Assignee: Fuji Jukogyo Kabushiki Kaisha, Japan

[21] Appl. No.: 544,316

[22] Filed: Oct. 17, 1995

[30] Foreign Application Priority Data

Oct. 27, 1994 [JP] Japan .................. 6-263528

[51] Int. Cl.$^6$ ........................... F16H 45/02
[52] U.S. Cl. ........................... 477/169; 477/180
[58] Field of Search .................... 477/169, 180

[56] References Cited

U.S. PATENT DOCUMENTS

| | | | |
|---|---|---|---|
| 4,947,734 | 8/1990 | Fujita et al. | 477/169 |
| 5,029,087 | 7/1991 | Cowan et al. | 477/169 |
| 5,086,894 | 2/1992 | Iizuki et al. | 477/180 |
| 5,121,820 | 6/1992 | Brown | 477/180 |
| 5,318,159 | 6/1994 | Kashiwabara | 477/169 |
| 5,323,320 | 6/1994 | Hathaway et al. | 477/169 |
| 5,484,353 | 1/1996 | Lux et al. | 477/169 |
| 5,484,354 | 1/1996 | Vukovich et al. | 477/169 |
| 5,498,217 | 3/1996 | Murayama et al. | 477/169 |

*Primary Examiner*—Dirk Wright
*Attorney, Agent, or Firm*—Beveridge, DeGrandi, Weilacher & Young, L.L.P.

[57] ABSTRACT

A lockup control apparatus and method of an automatic transmission engages a lockup clutch smoothly by gradually varying an electrical signal and holds a lockup pressure at a level corresponding to the engine load when the lockup clutch is engaged. The engagement of the lockup clutch is detected by comparing an engine rotational speed with a turbine rotational speed. The lockup pressure is determined at a minimal value enabling the lockup clutch to be engaged with a sufficient margin. Advantages of the lockup control apparatus are that shocks occured when the lockup clutch is engaged or disengaged can be attenuated and the life of the lockup clutch is substantially prolonged.

9 Claims, 6 Drawing Sheets

FIG. 4

LOCKUP CONTROL APPARATUS FOR AUTOMATIC TRANSMISSION AND THE METHOD THEREOF

BACKGROUND OF THE INVENTION

1. Field of the Invention

The present invention relates to a control system and a method of a lockup control for a vehicular automatic transmission and particularly to a hydraulic pressure control of the lockup clutch when a lockup is operative.

2. Prior Arts

In modern automatic transmissions, an electronic transmission control is becoming popular and a lockup control in an automatic transmission is no exception. In a case of the lock-up control, for example, when an ATF (automatic transmission fluid) temperature is above a predetermined value and when the gear is at the positions ranging from 2nd to 4th excepting 1st, the lockup clutch is electronically controlled for saving fuel at a normal mode and for increasing power at a power mode. Further, in controlling the lockup clutch controls for attenuating a shock at the engagement of the clutch and the like are performed by increasing hydraulic pressure gradually.

Generally, a torque capacity of the lockup clutch varies according to miscellaneous factors such as ATF temperature, hydraulic pressure, a friction coefficient of a clutch facing, engine torque or the like. Therefore, usually the lockup clutch is designed with a sufficient capacity so as not to lack in capacity under any conditions. For example, it is designed so as to have a large contact surface and a high hydraulic pressure for engaging the lockup.

However, there are so many cases where the hydraulic pressure as well as the torque capacity become excessively large, for example when the ATF temperature is low and the engine torque is small. As a result, this higher lockup pressure than necessary exerts an adverse effect on the durability and the life of the clutch facing of the lockup clutch.

With respect to the pressure control of the lockup clutch, for example, Japanese Unexamined Patent Application No. Toku-Kai-Sho 60-101357 discloses a technique that the clutch engagement force can be varied by switching the lockup pressure from a high mode to a low mode or vice-versa according to the slip ratio of the clutch, namely, the rotational speed ratio of an input to and an output from the lock-up clutch. By means of this pressure control, shocks, vibrations or the like can be reduced. Further, Japanese Unexamined Patent Application No. Toku-Kai-Sho 61-160662 discloses another technique for reducing shocks and the like in which the lockup pressure is increased step-by-step by use of an accumulator and a lockup control valve provided in the hydraulic circuit.

In those prior arts described above, the engagement force in the transfer stage from a released state to an engaged state is increased gradually or in a step-by-step manner for a smooth engagement. However, since the lockup pressure at the final stage is always controlled at a specified high value, there is still a fear that the life of the clutch is shortened.

SUMMARY OF THE INVENTION

Accordingly, the present invention is intended to obviate the abovementioned disadvantages of the prior arts and it is summarized as follows.

It is an object of the present invention to provide a lockup control apparatus in which the hydraulic pressure is controlled at a minimal level when the lock-up clutch is engaged so as to enhance the endurance of the lockup clutch.

It is another object of the present invention to provide a lockup control apparatus capable of preventing a shock when the lockup clutch is disengaged as well as engaged.

A first aspect of the present invention is provided in a lockup control apparatus of an automatic transmission which features:

lockup control means for outputting a lockup engaging signal to engage a lockup clutch or a lockup disengaging signal to disengage the lockup clutch based on said signals from an inhibitor switch, an oil temperature sensor, a throttle opening angle sensor and a vehicle speed sensor;

gear position determining means for determining a gear position based on a throttle opening angle signal and a vehicle speed signal and for outputting a gear position signal;

turbine speed calculating means for calculating a turbine speed based on the gear position and the vehicle speed signal and for outputting a turbine speed signal;

lockup engagement judging means for comparing the engine speed with the turbine speed and for outputting an engagement signal when the engine speed is equal to the turbine speed;

target duty ratio determining means for determining a target duty ratio at a duty ratio of the instance when the engagement signal is inputted and for outputting the target duty ratio;

smooth control instruction means for outputting a smooth control instruction signal so as to engage the lockup clutch smoothly and for outputting a hold signal so as to hold the duty ratio at the target duty ratio when the engagement signal is inputted; and output control means for conducting the smooth control when the smooth control instruction signal is inputted and for holding the duty ratio at the target duty ratio when the hold signal is inputted.

A second aspect of the present invention is provided in a lockup control apparatus of an automatic transmission which features:

lockup control means for outputting a lockup engaging signal to engage a lockup clutch or a lockup disengaging signal to disengage the lockup clutch based on signals from an inhibitor switch, an oil temperature sensor, a throttle opening angle sensor and a vehicle speed sensor;

gear position determining means for determining a gear position based on a throttle opening angle signal and a vehicle speed signal and for outputting a gear position signal;

turbine speed calculating means for calculating a turbine speed based on the gear position signal and the vehicle speed signal and for outputting a turbine speed signal;

lockup engagement judging means for comparing the engine speed with the turbine speed and for outputting an engagement signal when the engine speed is equal to the turbine speed;

target duty ratio determining means for determining a target duty ratio by adding a predetermined value to a duty ratio of the instance when the engagement signal is inputted and for outputting the target duty ratio;

smooth control instruction means for outputting a smooth control instruction signal so as to engage the lockup clutch smoothly and for outputting a hold signal so as to hold the duty ratio at the target duty ratio when the engagement signal is inputted; and output control means for conducting the smooth control when the smooth control instruction signal is inputted and for holding the duty ratio at the target duty ratio when the hold signal is inputted.

BRIEF DESCRIPTION OF THE DRAWINGS

The object of the present invention will become apparent from a reading of a detailed description taken in conjunction with the drawings, in which.

DETAILED DESCRIPTION OF PREFERRED EMBODIMENTS

Embodiments according to the present invention will be described in detail with reference to the accompanying drawings.

Figure 1:
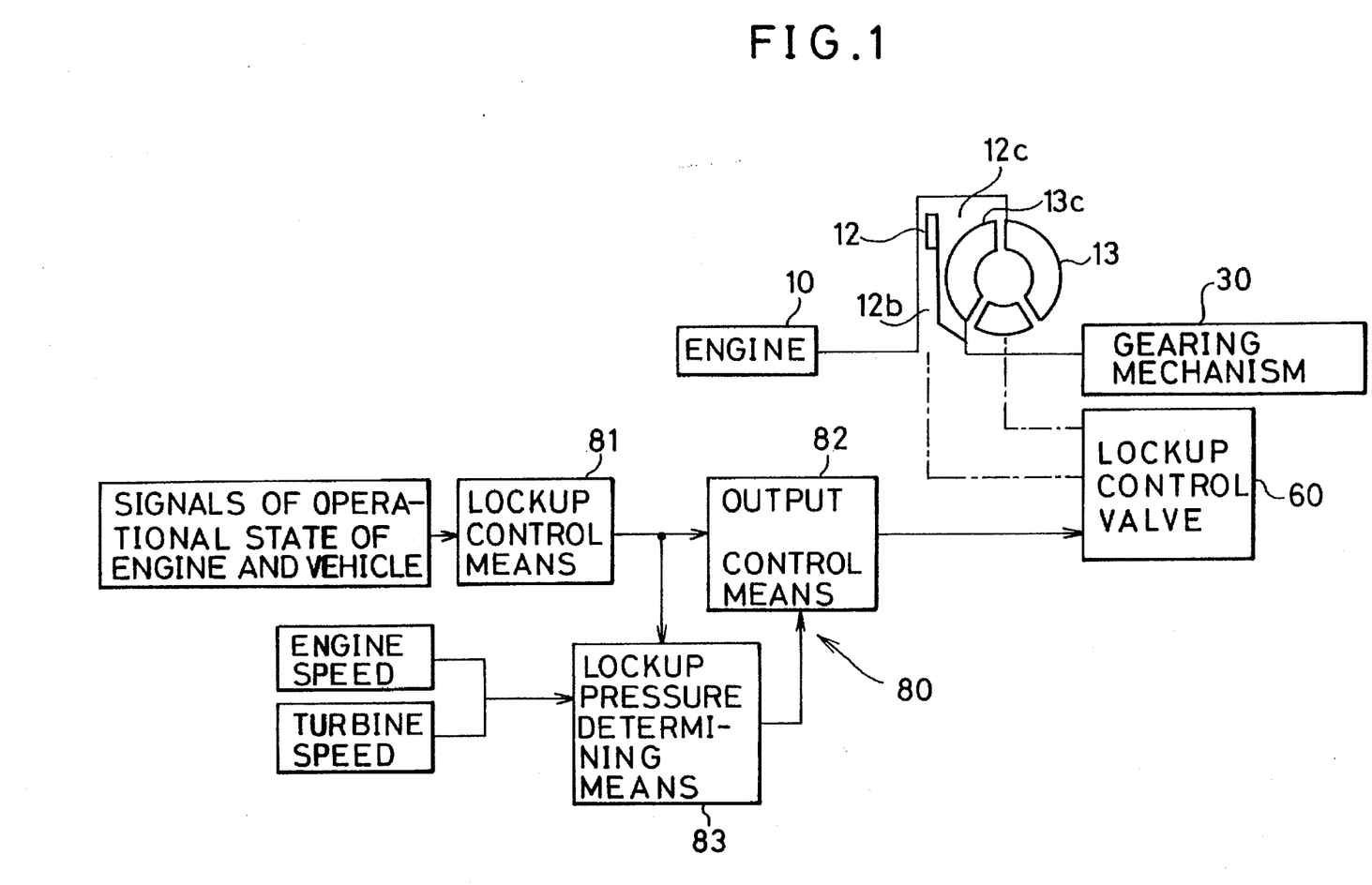
FIG. 1 is a block diagram of a lock-up control system for an automatic transmission according to the present invention.
Figure 2:
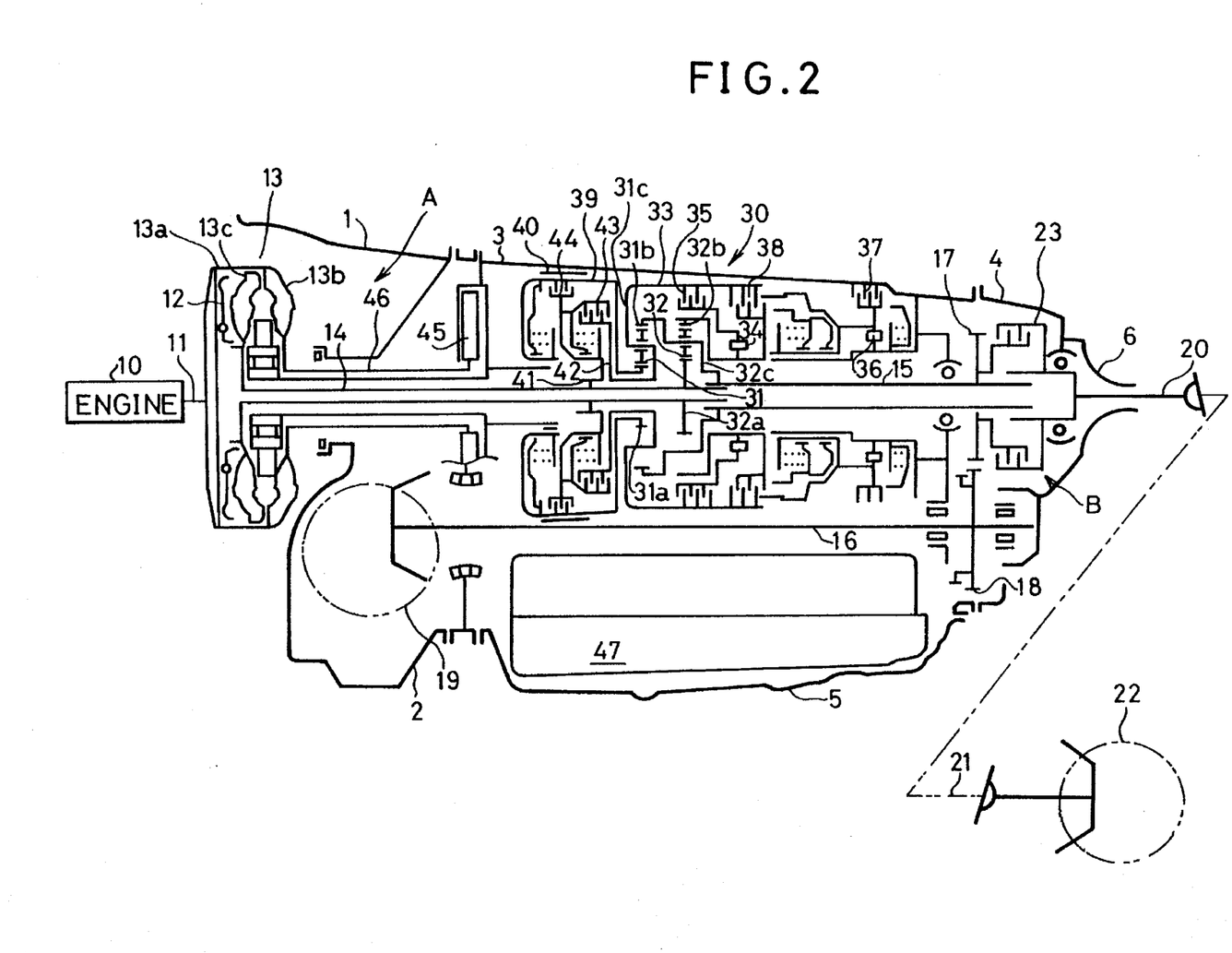
FIG. 2 is a diagrammical cross sectional view showing an example of an automatic transmission.

Referring now to FIG. 2, the power train system is one for a fourwheel drive vehicle having an automatic transmission in which an engine 10, an automatic transmission A and a fourwheel drive section B are constituted.

With respect to the automatic transmission A, a crank shaft 11 of the engine 10 is connected in a torque converter case 1 with a pump impeller 13b of a torque converter 13 through an impeller cover 13a. A turbine 13c is connected with an automatic shift gear mechanism (hereinafter referred to as gearing mechanism) 30 in a transmission case 3 through an input shaft 14. A lockup clutch 12 is provided between the impeller cover 13a and the turbine 13c so as to transmit torque of the engine 10 directly to the gearing mechanism 30 by bypassing the torque converter 13. Further, an output shaft 15 of the automatic transmission A is provided behind the gearing mechanism 30 coaxially with the input shaft 14.

In the fourwheel drive section B, a front drive shaft 16 is provided in parallel with the input and output shafts 14, 15 in the transmission case 3 and is connected with the output shaft 15 through a pair of reduction gears 17, 18. The front end of the front drive shaft 16 is connected with a front wheel axle through a front differential apparatus 19 contained in a differential case 2 so as to transfer a front drive torque continuously to the front axle.

On the other hand, the reduction gear 17 integrally coupled with the output shaft 15 is connected with a rear drive shaft 20 bore by an extension case 6 through a transfer clutch 23 of a so-called hydraulic multi-disc type. A rear drive torque is transferred from the rear drive shaft 20 to a rear wheel axle through a propeller shaft 21 and a rear differential apparatus 22. The clutch torque of the transfer clutch 23 is controlled according to miscellaneous operating conditions, or road conditions such as starting on a road surface with a low friction coefficient, turning corners, braking and the like and according to this clutch torque, the torque is transmitted to the rear wheel, whereby the four-wheel drive is available.

In this example, the gearing mechanism 30 comprises a first planetary gear 31 and a second planetary gear 32 and it provides four forward speeds and one backward speed. That is to say, the input shaft 14 is connected with a sun gear 32a of the second planetary gear 32 and the output shaft 15 is connected with a ring gear 31b of the first planetary gear 31 and a carrier 32c of the second planetary gear 32. Further, a first one way clutch 34 and a forward clutch 35 are provided in series between a connecting element 33 formed integrally with a carrier 31c of the first planetary gear 31 and a ring gear 32b of the second planetary gear 32 and a second one way clutch 36 and a low-reverse brake 37 are provided in parallel with each other between the connecting element 33 and a transmission case which is a stationary member. Further, an overrunning clutch 38 is disposed between the connecting element 33 and the ring gear 32b of the planetary gear 32, bypassing the forward clutch 35 and the one way clutch 34.

A band brake 40 is provided in a connecting element 39 constituted integrally with a sun gear 31a and a high clutch 43 is provided between a connecting element 41 formed integrally with the input shaft 14 and a connecting element 42 formed integrally with the carrier 31c. Further, a reverse clutch 44 is disposed between the connecting elements 39 and 41.

In the construction of this gearing mechanism 30, when the gear is positioned at the first speed of ranges "D", "3" or "2", the forward clutch 35 is engaged. When the vehicle is in acceleration, the ring gear 32b is locked by the act of the both one way clutches 34, 35 and torque is transmitted to the output shaft 15 through the sun gear 32a and the carrier 32c. On the other hand, when the vehicle is coasting, the first one way clutch 34 becomes free. Then, since the over-running clutch 38 is engaged, the second one way clutch 36 becomes free even when the rotation of the first one way clutch 34 is restricted, thereby the engine brake is not applied. When the gear is positioned at the first speed of a "1" range (low hold), since the ring gear 32b is always locked through the over-running clutch 38 by the engagement of the low-reverse clutch 37, engine braking is operative.

When the gear is positioned at the second speed of ranges "D", "3" or "2", the forward clutch 35 and the band brake 40 are engaged and the sun gear 31a is locked by the band brake 40 applied. Then, the carrier 31c and the ring gear 32b are rotated through the connecting element 33, the forward clutch 35 and the first one way clutch 34. Due to the rotation of the ring gear 32b, a torque is generated according to the speed of the ring gear 32b increased more than the one at the first speed. When the vehicle is coasting, the connecting element 33 and the ring gear 32b are retained to be connected with each other by the engagement of the overrunning clutch 38 and as a result a driven torque is transmitted to the engine, whereby engine braking is operated.

When the gear is positioned at the third speed of ranges "D" or "3", the forward clutch 35 and the high clutch 43 are engaged respectively and by this engagement of the high clutch 43, the input shaft 14 is connected with the ring gear 32b through the connecting elements 41, 32, the carrier 31c, the connecting element 33, the forward clutch 35 and the first one way clutch 34. As a result, the second planetary gear 32 is integrated and the input shaft 14 is directly connected with the output shaft 15. When the vehicle is coasting, engine braking is operated in the same manner as in the second gear by restricting the rotation of the first one way clutch 34 through the engagement of the overrunning clutch 38.

When the gear is positioned at the fourth gear of the "D" range, the band brake is applied in addition to the above and the sun gear 31a is locked, Then, in the first planetary gear 31 the ring gear 31b increases its rotational speed by use of the torque inputted to the carrier 31c through the high clutch 43 and a torque generated by the rotation of the ring gear 31b is transmitted to the output shaft 15. In this case, engine braking is always applied because the driven torque is transmitted to the engine with-out going through the first and second one way clutches 34 and 36.

When the gear is positioned at the "R" range, the torque from the input shaft 14 is inputted to the sun gear 31a by the engagement of a reverse clutch 44. Further, since the carrier 31c is locked together with the connecting element 33 by the engagement of a low & reverse clutch 37, the ring gear 31b of the first planetary gear 31 is rotated in the reverse direction and the reverse torque is transmitted to the output shaft 15. Thus, in the gearing mechanism 30 4-forward speeds and 1-reverse speed are obtained.

On the other hand, a hydraulic pump 45 is provided ahead of the gearing mechanism 30 and it is driven constantly by a drive shaft 46 connected integrally with the pump impeller 13b of the torque converter 13. Further, there is provided with an oil pressure control mechanism 47 for controlling hydraulic pressure, the lockup clutch 12, the torque converter 13, the gearing mechanism 30 and the transfer clutch 23, in an oil pan 5 under the transmission case 3.

Figure 3A:
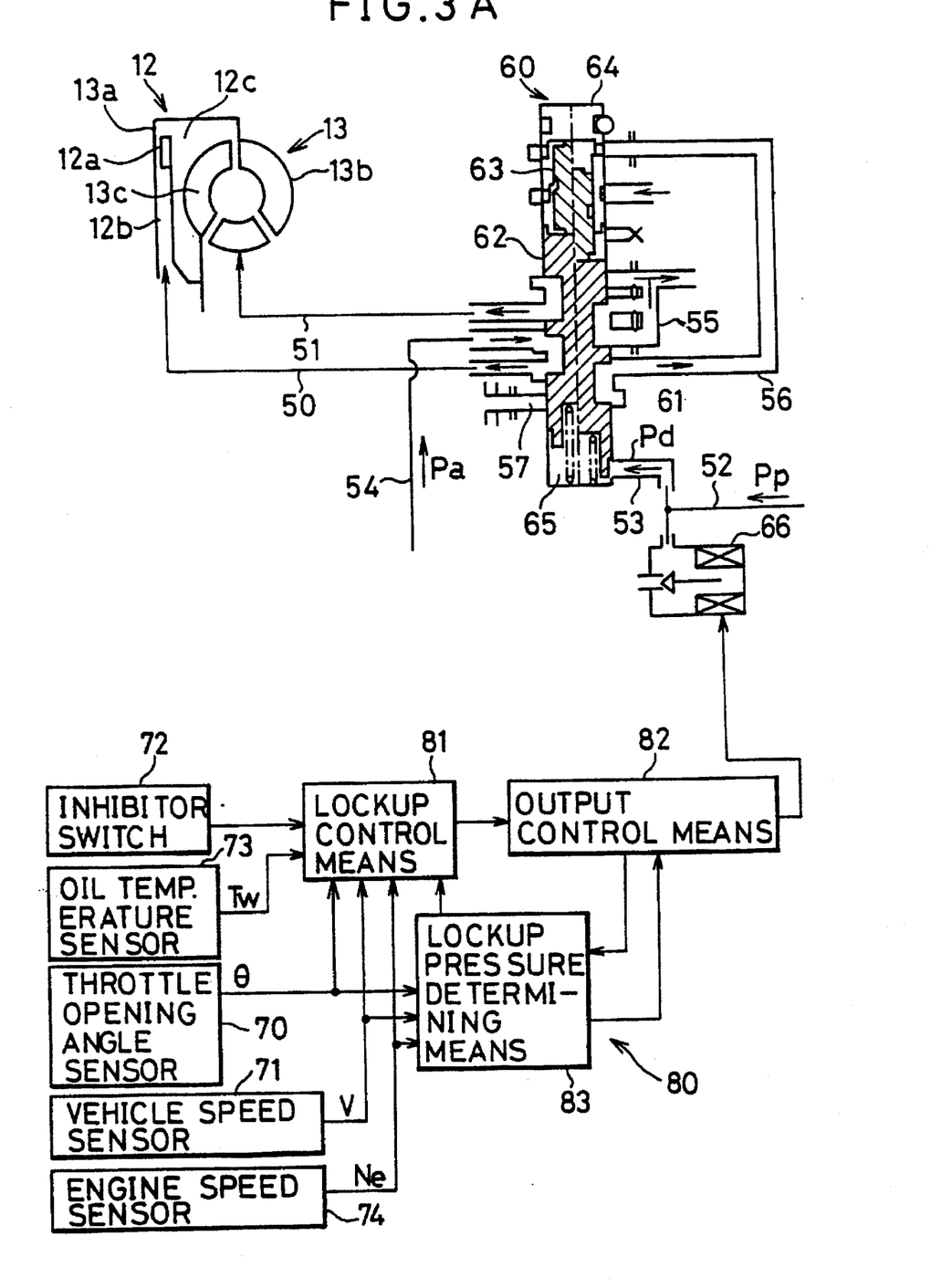
FIG. 3A is a block diagram showing a construction of a lockup clutch and a control apparatus.

Referring to FIG. 3A, a lockup control apparatus will be described.

In the lockup clutch 12, a piston 12a is provided against the inner wall of the impeller cover 13a integrally connected with the crank shaft 11. The piston 12a is connected integrally with the turbine 13c. A release chamber 12b is provided at the front of the piston 12a and an apply chamber 12c is provided behind the piston 12a. The release chamber 12b and the apply chamber 12c are connected with a lockup control valve 60 through a release passage 50 and an apply passage 51 respectively.

The lockup control valve 60 comprises a valve body 61, a valve 62, a sleeve 64 and a plug 63 inserted into the sleeve 64. At the opposite side of the plug 63, there is provided an oil pressure chamber 65 with which a duty solenoid valve 66 is communicated through an oil passage 53 to supply a pilot pressure Pp from an oil passage 52. A specified oil pressure Pd is generated by draining oil by way of the duty signal from the control unit 80 for example ranging from 5% to 95% of duty ratio. When the duty ratio is 5%, the highest duty pressure Pd is generated and the valve 62 is pushed upward, as shown by a left half figure of the valve in FIG. 3A. Then, an oil passage 54 of the working pressure Pa is opened to the release passage 50 and the apply passage 51 is communicated with an oil passage 55 to an oil cooler. When the duty ratio is 95%, the valve 62 is pushed downward by the lowest duty pressure Pd, as shown by a right half figure of the valve in FIG. 3A. Then, the oil passage 54 is communicated with the apply passage 51 and the release passage 50 is opened to the plug 63 through an oil passage 56 and also to a drain passage 57.

Next, the electronic control system will be described with reference to FIG. 3A.

Signals from a throttle opening angle sensor 70, a vehicle speed sensor 71, an inhibitor switch 72, an oil temperature sensor 73 and an engine speed sensor 74 are inputted to a lockup control means 81 of the control unit 80. The lockup engaging and disengaging are determined by referring to predetermined engaging and disengaging conditions. The engaging and disengaging conditions are predetermined for example such that the lockup is disengaged when ATF temperature is below 40 degrees centigrade, when the gear is at the first speed, when the select Lever is at "N", "R" and "P" ranges, when the gear is shifted up or shifted down, or when the throttle valve is fully open, and the lockup is engaged in the conditions other than those. The signals of the result of these determinations are inputted to an output control means 82 where in case of disengaging the lockup a duty signal of 5% duty ratio for example is outputted to release the lockup clutch 12 and in case of engaging the lockup variable duty signals are outputted so as to increase the duty ratio for example from 5% to 95% gradually and thereby to engage the lockup clutch smoothly, that is, a smooth control is executed.

Further, the lockup control according to the present invention, is provided with a countermeasure for enhancing the durability of the lockup clutch as mentioned below.

Whether the lockup clutch is engaged or not can be known by comparing the turbine rotational speed Nt with the engine rotational speed Ne. First, in lockup pressure determining means 83, the turbine rotational speed Nt is calculated based on the vehicle speed V and the gear position G which is determined by the vehicle speed V and the throttle opening angle θ and then the calculated turbine speed Nt is compared with the engine speed Ne. When the turbine speed Nt is equal to the engine speed Ne, it is judged that the lockup clutch 12 has been engaged. Upon the judgement, a duty ratio Do of that moment is memorized and then a target duty ratio Dt is determined by adding a given margin α to the duty ratio Do. Next, in output control means 82, when the duty ratio D reaches the target duty ratio Dt while it is increasing by the smooth control, the duty ratio D is retained at the target duty ratio Dt. Thus, since the upper limit of lockup pressure is varied and retained according to vehicle operating conditions, necessary and minimal lockup pressure can always be applied to the lockup clutch and the life of the lockup clutch can be substantially prolonged.

Next, the function of this embodiment will be described.

First, the power of the engine 10 is inputted to the gearing mechanism 30 through the torque converter 13 and the input shaft 14. When the select lever is shifted to the "D" range, the power is automatically controlled by the operation of two pairs of planetary gears 31, 32 and by the selective engagements of the cluches 44, 43, 35, 38 and the band brakes 40, 37. When the select lever is shifted to the "R" range, the reverse speed is obtained. The torque and rotational speed changed by the torque converter 13 and the gearing mechanism 30 is transferred to the front wheels through the output shaft 15, the reduction gears 17, 18 and the front drive shaft 16. Further, when a clutch torque is generated in the transfer clutch 23 according to the running conditions, the power is transmitted also to the rear wheels in accordance with the clutch torque.

In the lockup control means 81 of the control unit 80, it is judged whether the lockup is to be engaged or not. That is, when the engine is idling with the throttle valve fully closed or when the gear is at the first speed, it is judged that the lockup is to be disengaged and the constant duty signal of 5% duty ratio is outputted to the duty solenoid valve 66 from the output control means 82. Then, due to the small number of the duty ratio a high duty pressure Pd is applied to the valve 62, whereby the release passage 50 is opened. By this operation, the working oil pressure Pa is applied to the release chamber 12b and the oil flows into the torque converter 13 from the release chamber 12b. As a result of this, the piston 12a is forcedly detatched from the impeller cover 13a and the engine power is transmitted to the input shaft 14 through the torque converter 13.

When the gear is at the second position or higher, the lockup engaging condition is met. Referring to a time chart in FIG. 5, when the vehicle starts with the first gear, as mentioned above, since the lockup clutch 12 is released, the engine speed Ne is larger than the turbine speed Nt because of the operational principle of the torque converter 13. At the time t1, the gear is shifted from 1st to 2nd and the lockup engaging conditions are met. According to a flow chart in FIG. 4, this process corresponds to steps S1 to S2.

Figure 4:
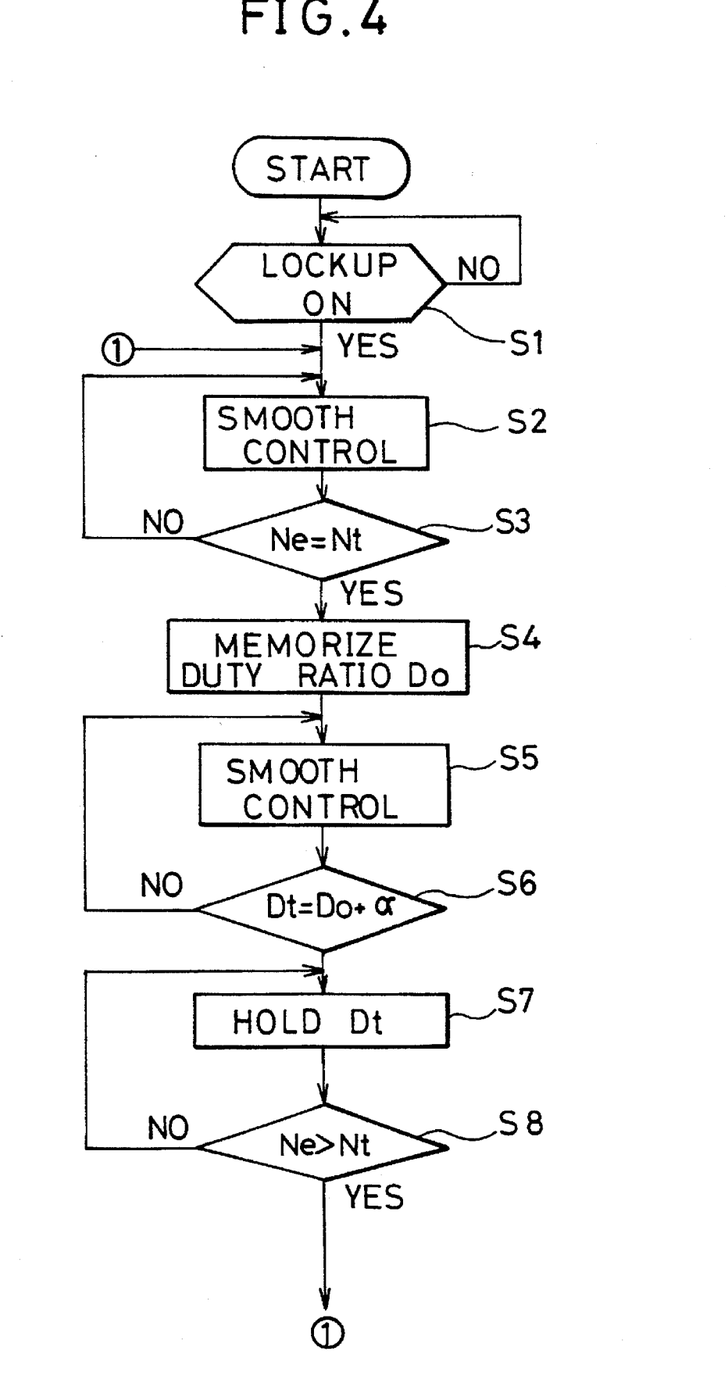
FIG. 4 is a flow chart showing steps for controlling a lockup Clutch.
Figure 5:
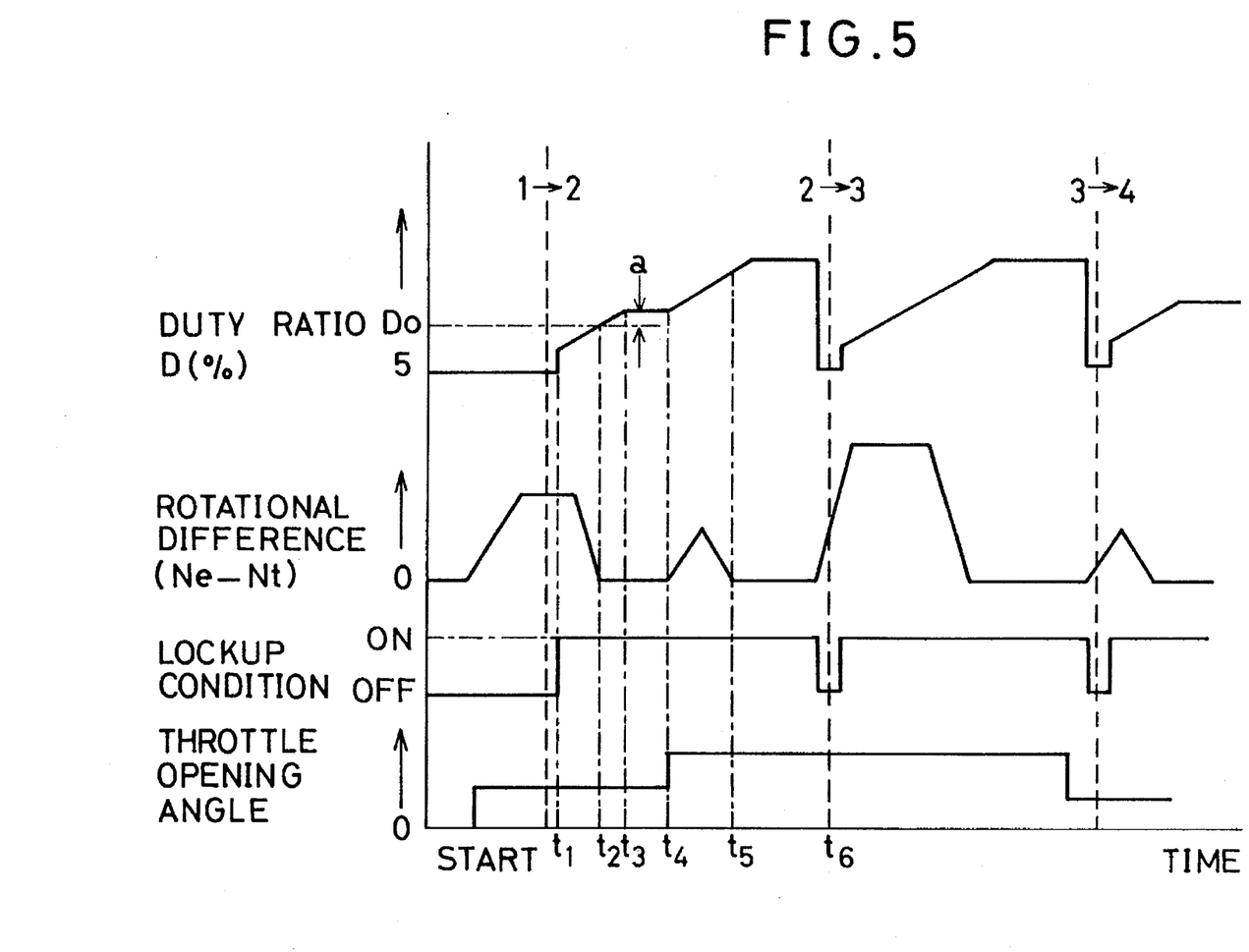
FIG. 5 is a time chart showing an operational state of a lockup control apparatus.

That is to say, the duty signals are outputted to the solenoid valve 66 while the duty ratio increases from 5% gradually and the duty pressure Pd decreases gradually. Then, the valve 62 of the lockup control valve 60 is shifted in such a direction that it is communicated with the apply passage 51, the release chamber 12b is evacuated due to the closing of the inflow of the working oil pressure Pa and on the other hand the apply chamber 12c is pressurized by the inflow of the working oil pressure Pa into the torque converter 13. By this operation, the lockup clutch 12 becomes in a half engaging condition and the pressure difference between the both chambers gradually increases. Then, the difference between Ne and Nt is reduced rapidly.

Then, at a step S3 it is judged whether or not the engine speed Ne becomes equal to the turbine speed Nt. In case where the engine load is judged to be small based upon the throttle opening angle θ, the piston 12a is contacted with the impeller cover 13a by the small pressure difference between the release chamber 12b and the apply chamber 12c soon after the lockup-ON at the step S1, namely at the time t2 when the duty ratio is still small in its increasing stage and the lockup clutch 12 is engaged.

When the lockup clutch 12 is engaged, since the engine speed Ne becomes equal to the turbine speed Nt, the process goes from the step S3 to a step S4 where the small duty ratio Do of that moment is memorized. At the next step S6 it is judged whether or not the duty ratio reaches the target duty ratio Dt (Dt=Do+α). When the duty ratio reaches the target duty ratio Dt at the time t3, the process goes to a step S7 where the duty ratio is retained at Dt. After that, at a step S8 the engine speed Ne is compared with the turbine speed Nt again and the duty ratio continues to hold the small target duty ratio Dt as far as the lockup clutch is fully engaged, i.e., Ne=Nt.

As described above, in case where the engine load is small and the lockup clutch is engaged relatively soon, the target duty ratio Dt is set in a small number with a sufficient margin. Therefore, the lockup pressure in the apply chamber 12c is kept small and the torque capacity of the lockup clutch 12 becomes small according to the engine load, whereby the lockup clutch can be kept in full engagement with a minimal lockup pressure.

On the other hand, when the throttle opening angle θ becomes large at the time t4 and the engine load becomes larger than the torque capacity of the lockup clutch 12, the lockup clutch 12 is in a half engagement state while it is slipping and the engine speed Ne becomes larger than the turbine speed Nt. In this case, the process returns from the step S8 to the step S2 for repeating the control mentioned above. After the time t4, the duty ratio D increases gradually again through the smooth control and thereby the pressure difference between the apply chamber 12c and the release chamber 12b is increased by the operation of the lockup control valve 60. Further, when at the time t5 the lockup clutch 12 is engaged, i.e., Ne=Nt, since the duty ratio Do of that moment is memorized, the target duty ratio Dt calculated based on that duty ratio Do is set at a high level and consequently the lockup pressure is also set high. Thus, the lockup clutch 12 is engaged with a large torque capacity corresponding to the large engine load.

Further, when at the time t6 the gear is shifted from 2nd to 3rd, right before that moment due to the disengagement condition of the lockup the duty ratio D is made minimum (5%) and the lockup clutch 12 is released instantly. Once the engagement condition is met, the lockup control starts again as shown in FIG. 4. In this case, when the engine load is large and the engagement comes late, the lockup pressure is controlled toward a high level and when the engine load is small and the engagement comes soon, the lockup pressure is controlled toward a low level. Thus, the lockup clutch 12 is engaged by the minimal lockup pressure according to the engine load, whereby an excessive lockup pressure is prevented from being applied to the lockup clutch 12. Further, since the minimal lockup pressure according to the engine load is applied to the lockup clutch 12, the shock at the moment when the lockup is released is attenuated.

Figure 3B:
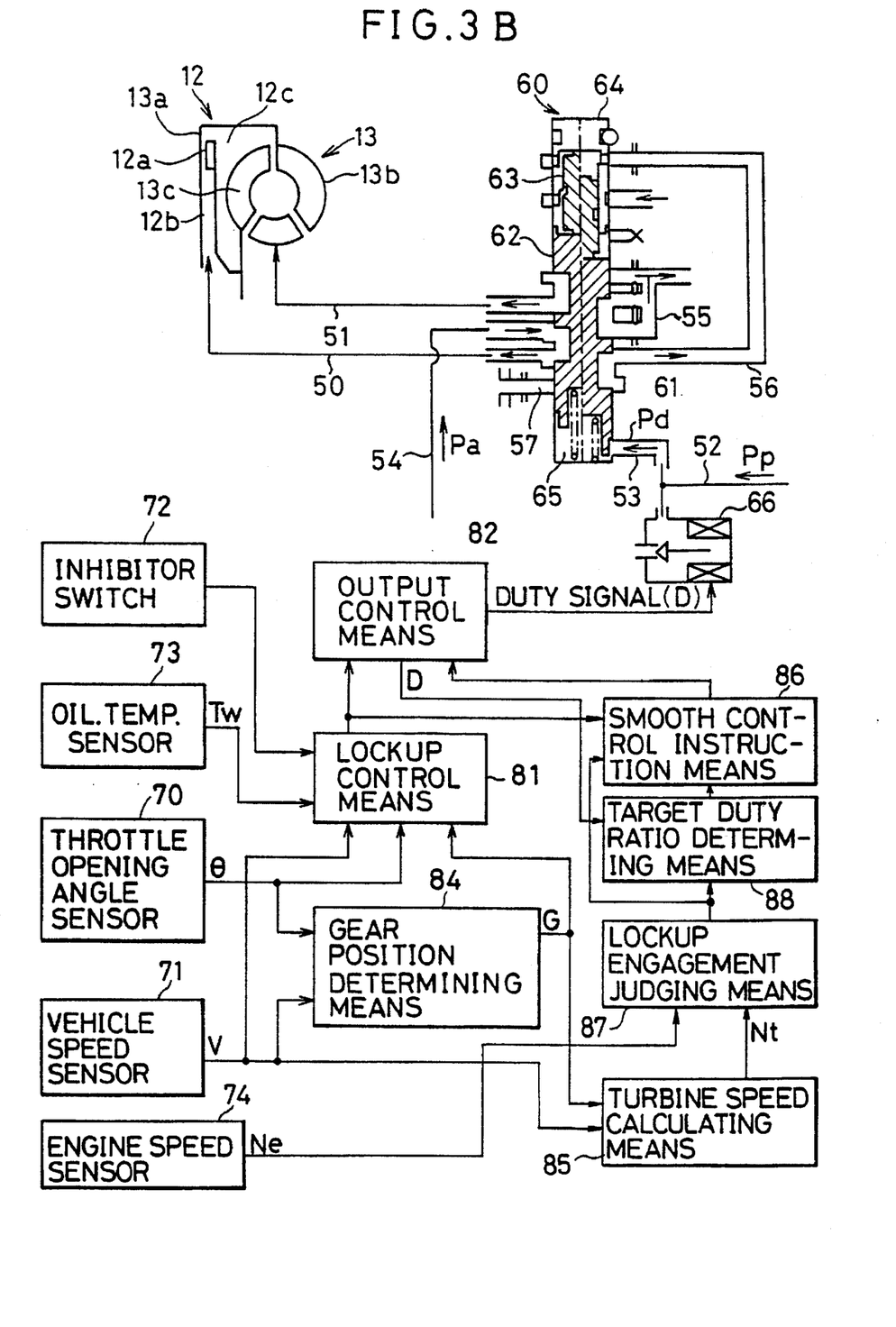
FIG. 3B is a block diagram showing a construction of a lockup clutch and a control apparatus in more detail.

More specifically, referring to FIG. 3B, the aforementioned lockup pressure determining means 83 will be described in detail.

The lockup pressure determining means 83 are divided functionally into gear position determining means 84, turbine speed calculating means 85, lockup engagement judging means 87, target duty ratio determining means 88 and smooth control instruction means 86. The gear position determining means determines a gear position G of that moment based upon the throttle opening angle θ and the vehicle speed V. Further, the turbine speed calculating means 85 calculate a turbine speed Nt based upon the gear position G and the vehicle speed V. In the lockup engagement judging means 87, it is judged whether or not the lockup clutch is engaged from the coincidence of the engine speed Ne with the turbine speed Nt. That is, when the engine speed becomes equal to the turbine speed Nt, it is judged that the lockup clutch has been engaged and an engagement signal is outputted from the lockup engagement judging means 87. The engagement signal is inputted to the target duty ratio determining means 88 wherein a target duty ratio Dt is determined based on the duty ratio of that moment from the output control means 82. Further, in the smooth control instruction means 86, when the lockup engaging signal is inputted thereto, a smooth control instruction signal is transmitted to the output control means 82 so as to instruct the smooth control therein when the engagement signal is inputted from the lockup engagement judging means 87. Further, in the smooth control instruction means 86 it is judged whether or not the duty ratio reaches the target duty ratio Dt and when D=Dt, a hold signal is outputted to the output control means 82 so as to retain the duty ratio at the target duty ratio Dt. On the other hand, when the lockup disengaging signal is outputted, the output control means 82 retains the duty signal at a specified minimum duty ratio so as to release the lockup clutch 12.

In the embodiment described above, the target duty ratio Dt is determined such that the duty ratio Do of the moment, when it is judged that the lockup clutch has been engaged, is increased by a predetermined margin α. However, the target duty ratio Dt may be equal to the duty ratio Do of the moment when it is judged that the lockup clutch has been engaged.

Furthermore, the aforementioned embodiment according to the present invention can be applied to any automatic transmissions equipped with a lockup clutch. Further, the lockup control valve may be a type of valve which is operated directly by lockup engaging or disengaging signals. The lockup engaging and disengaging signals may be analogue signals instead of digital ones like duty signals described in this embodiment. The input signals other than oil temperature may be used for indicating the engine operating conditions. Further, any combinations of signals other than throttle opening angle, vehicle speed, inhibitor switch and ignition pulse source may be used for the ones indicating the vehicle operating conditions.

In summary, since the lockup control apparatus can engage the lockup clutch smoothly by varying the electrical signal gradually and hold the minimal lockup pressure corresponding to the engine load, the life of the lockup clutch is prolonged and the shock when the lockup clutch is engaged can be largely reduced. Further, since the lockup pressure applied to the lockup clutch has an sufficient margin related the engine load, the engaging of the lockup clutch can be secured under any driving conditions. Further, since the lockup torque is provided according to the engine load, the shock caused in the transfer process from engaging to disengaging also can be attenuated.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A lockup clutch control apparatus of an automatic transmission of a vehicle having a torque converter interposed between an engine and a gearing mechanism for hydraulically transmitting power from said engine to said gearing mechanism, a lockup clutch interposed between said engine and said gearing mechanism for bypassing said torque converter and mechanically transmitting power from said engine to said gearing mechanism, a lockup clutch control valve hydraulically connected to said lockup clutch for controlling engagement of said lockup clutch, a duty solenoid valve connected to said lockup clutch control valve for controlling said lockup clutch control valve, operating condition detecting means for sensing an operating condition of said engine and said vehicle and for generating an operating signal indicative thereof, an engine speed sensor for detecting a speed of said engine and for generating an engine speed signal indicative thereof, and a turbine speed sensor for detecting a turbine speed of a turbine in said torque converter and for producing a turbine speed signal indicative thereof, comprising:

lockup control means responsive to said operating signal for determining if said lockup clutch is to be engaged based on said operating condition of said engine and said vehicle and for outputting a control signal indicative thereof;

lockup pressure determining means responsive to said engine speed signal, said turbine speed signal and said control signal for selecting a duty ratio of said duty solenoid valve at a predetermined value when said engine speed is approximately equal to said turbine speed and for generating a pressure signal indicative thereof; and output control means responsive to said control signal and said pressure signal for gradually changing said duty ratio until reaching said predetermined value and then for maintaining said duty ratio at said predetermined value so as to gradually and securely engage said lockup clutch at a minimum pressure thereto without shock.

2. A lockup clutch control apparatus of an automatic transmission having a torque converter interposed between an engine and a gearing mechanism for hydraulically transmitting power from said engine to said gearing mechanism, a lockup clutch interposed between said engine and said gearing mechanism for bypassing said torque converter and mechanically transmitting power from said engine to said gearing mechanism, a lockup clutch control valve hydraulically connected to said lockup clutch for controlling engagement of said lockup clutch, a duty solenoid valve connected to said lockup clutch control valve for controlling said lockup clutch control valve, an inhibitor switch mounted on said automatic transmission for sensing a gear position thereof and for generating an inhibitor signal indicative thereof, an oil temperature sensor provided in said automatic transmission for sensing an oil temperature and for outputting an oil temperature signal indicative thereof, a throttle sensor for detecting an opening degree of a throttle valve and for producing a throttle signal indicative thereof, a vehicle speed sensor for detecting a vehicle speed and for producing a vehicle speed signal indicative thereof and an engine speed sensor for detecting an engine speed and for generating an engine speed signal indicative thereof, comprising:

lockup pressure determining means responsive to said throttle signal, said vehicle speed signal and said engine speed signal for calculating a turbine speed of said torque converter and for selecting a duty ratio of said duty solenoid valve at a predetermined value when said engine speed is approximately equal to said turbine speed and for generating a pressure signal indicative thereof;

lockup control means responsive to said inhibitor signal, said oil temperature signal, said throttle signal, said vehicle speed signal, said engine speed signal and said pressure signal for determining if said lockup clutch is to be engaged based on operating conditions of said engine and said vehicle and for outputting a control signal indicative thereof; and output control means responsive to said control signal and said pressure signal for gradually changing said duty ratio until reaching said predetermined value and then for maintaining said duty ratio at said predetermined value so as to gradually and securely engage said lockup clutch at a minimum pressure thereto without shock.

3. A lockup clutch control apparatus of an automatic transmission having a torque converter interposed between an engine and a gearing mechanism for hydraulically transmitting power from said engine to said gearing mechanism, a lockup clutch interposed between said engine and said gearing mechanism for bypassing said torque converter and mechanically transmitting power from said engine to said gearing mechanism, a lockup clutch control valve hydraulically connected to said lockup clutch for controlling engagement of said lockup clutch, a duty solenoid valve connected to said lockup clutch control valve for controlling said lockup clutch control valve, an inhibitor switch mounted on said automatic transmission for sensing a gear position thereof and for generating an inhibitor signal indicative thereof, an oil temperature sensor provided in said automatic transmission for sensing an oil temperature and for outputting an oil temperature signal indicative thereof, a throttle sensor for detecting an opening degree of a throttle valve and for producing a throttle signal indicative thereof, a vehicle speed sensor for detecting a vehicle speed and for producing a vehicle speed signal indicative thereof and an engine speed sensor for detecting an engine speed and for generating an engine speed signal indicative thereof, comprising:

gear position determining means responsive to said throttle signal and said vehicle speed signal for determining a gear position and for producing a gear position signal indicative thereof;

turbine speed calculating means responsive to said vehicle speed signal and said gear position signal for calculating a turbine speed and for outputting a turbine speed signal indicative thereof;

lockup engagement judging means responsive to said engine speed signal and said turbine speed signal for determining whether said lockup clutch is engaged and for delivering an engagement signal indicative thereof;

target duty ratio determining means responsive to said engagement signal for calculating a target duty ratio and for generating a target duty ratio signal indicative thereof;

lockup control means responsive to said inhibitor signal, said oil temperature signal, said throttle signal, said vehicle speed signal and said gear position signal for determining if said lockup clutch is to be engaged based on operating conditions of said engine and said vehicle and for outputting a control signal indicative thereof;

continuously-variable control means responsive to said target duty ratio signal and said control signal for generating a pressure signal in response to said control signal indicating said lockup clutch is to be engaged and for determining if a duty ratio of said duty solenoid valve is equal to said target duty ratio and for generating a maintaining signal indicative thereof, and     output control means responsive to said control signal, said pressure signal and said maintaining signal for gradually changing said duty ratio until reaching said target duty ratio and then for maintaining said duty ratio at said target duty ratio so as to gradually and securely engage said lockup clutch at a minimum pressure thereto without shock.

4. A lockup clutch control apparatus according to claim 3, wherein:

said target duty ratio is derived by adding a preset value to a minimum present duty ratio value when said engine speed reaches said turbine speed.

5. A lockup clutch control method of an automatic transmission of a vehicle having a torque converter interposed between an engine and a gearing mechanism for hydraulically transmitting power from said engine to said gearing mechanism, a lockup clutch interposed between said engine and said gearing mechanism for bypassing said torque converter and mechanically transmitting power from said engine to said gearing mechanism, a lockup clutch control valve hydraulically connected to said lockup clutch for controlling engagement of said lockup clutch, a duty solenoid valve connected to said lockup clutch control valve for controlling said lockup clutch control valve, operating condition detecting means for sensing an operating condition of said engine and said vehicle, an engine speed sensor for detecting a speed of said engine and a turbine speed sensor for detecting a turbine speed of a turbine in said torque converter, said method comprising:

determining if said lockup clutch is to be engaged to mechanically transmit power from said engine to said gearing mechanism based on operating conditions of said engine and said vehicle;

setting a duty ratio of said duty solenoid valve at a predetermined value when said engine speed is approximately equal to said turbine speed;

changing said duty ratio gradually until said duty ratio reaches said predetermined value; and     maintaining said duty ratio at said predetermined value.

6. A lockup clutch control method of an automatic transmission having a torque converter interposed between an engine and a gearing mechanism for hydraulically transmitting power from said engine to said gearing mechanism, a lockup clutch interposed between said engine and said gearing mechanism for bypassing said torque converter and mechanically transmitting power from said engine to said gearing mechanism, a lockup clutch control valve hydraulically connected to said lockup clutch for controlling engagement of said lockup clutch, a duty solenoid valve connected to said lockup clutch control valve for controlling said lockup clutch control valve, an inhibitor switch mounted on said automatic transmission for sensing a gear position thereof, an oil temperature sensor provided in said automatic transmission for sensing an oil temperature, a throttle sensor for detecting an opening degree of a throttle valve, a vehicle speed sensor for detecting a vehicle speed and an engine speed sensor for detecting an engine speed, said method comprising:

calculating a turbine speed of said torque converter;

setting a duty ratio of said duty solenoid valve at a predetermined value when said engine speed is approximately equal to said turbine speed;

determining if said lockup clutch is to be engaged to transmit power from said engine to said gearing mechanism based on operating conditions of said engine; and     changing said control signal gradually until said duty ratio, reaches said predetermined value; and     maintaining said duty ratio at said predetermined value.

7. A lockup clutch control method of an automatic transmission having a torque converter interposed between an engine and a gearing mechanism of said automatic transmission for hydraulically transmitting power from said engine to said gearing mechanism, a lockup clutch interposed between said engine and said gearing mechanism for bypassing said torque converter and mechanically transmitting power from said engine to said gearing mechanism, a lockup clutch control valve hydraulically connected to said lockup clutch for controlling engagement of said lockup clutch, a duty solenoid valve connected to said lockup clutch control valve for controlling said lockup clutch control valve, an inhibitor switch mounted on said automatic transmission for sensing a gear position thereof, an oil temperature sensor provided in said automatic transmission for sensing an oil temperature, a throttle sensor for detecting an opening degree of a throttle valve, a vehicle speed sensor for detecting a vehicle speed and an engine speed sensor for detecting an engine speed, said method comprising:

determining a gear position;

calculating a turbine speed of said torque converter;

determining if said lockup clutch is engaged;

calculating a target duty ratio corresponding to said gear position and said turbine speed when said lockup clutch is engaged;

determining if said lockup clutch is to be engaged to transmit power from said engine to said gearing mechanism is based on operating conditions of said engine and said vehicle;

computing an optimum control value of said duty ratio to engage said lockup clutch to approach said target duty ratio when said engine speed is approximately equal to said turbine speed; and changing said control signal gradually until said duty ratio reaches said predetermined value; and maintaining said duty ratio at said predetermined value.

8. A lockup clutch control method of an automatic transmission having a torque converter interposed between an engine and a gearing mechanism of said automatic transmission for hydraulically transmitting power from said engine to said gearing mechanism, a lockup clutch interposed between said engine and said gearing mechanism for bypassing said torque converter and mechanically transmitting power from said engine to said gearing mechanism, a lockup clutch control valve hydraulically connected to said lockup clutch for controlling engagement of said lockup clutch, a duty solenoid valve connected to said lock-up clutch control valve for controlling said lockup clutch control valve, an inhibitor switch mounted on said automatic transmission for sensing a gear position thereof, an oil temperature sensor provided in said automatic transmission for sensing an oil temperature, a throttle sensor for detecting an opening degree of a throttle valve, a vehicle speed sensor for detecting a vehicle speed and an engine speed sensor for detecting an engine speed, said method comprising:

deciding whether said lockup clutch is ON or OFF;

controlling said lockup clutch to continuously engage by linearly changing a duty ratio of said solenoid valve from a 5% to a 95% duty ratio without irregular increase when said lockup clutch is ON;

calculating a turbine speed from said opening degree and said vehicle speed;

detecting a present duty ratio when said engine speed becomes equal to said turbine speed;

memorizing said present duty ratio in a memory;

operating said lockup clutch to continuously engage by linearly changing said duty ratio of said solenoid valve until said vehicle speed reaches a desired speed at each gear position;

computing a target duty ratio corresponding to said gear position and said turbine speed when said lockup clutch is engaged;

holding said target duty ratio while said lockup clutch is engaged;

determining whether said engine speed becomes larger than said turbine speed;

returning to said holding step if said engine speed is smaller than said turbine speed; and repeating said controlling step until end so as to gradually and securely engage said lockup clutch at a minimum pressure thereto without shock and to effectively reach said desired speed without damaging thereof.

9. The lockup clutch control method according to claim 8, wherein:

said target duty ratio is derived by adding a preset value to a minimum present duty ratio value where said engine speed reaches said turbine speed.

* * * * *